Patented Oct. 7, 1952

2,613,149

UNITED STATES PATENT OFFICE 2,613,149

DIAZOTYPE PHOTOPRINTING MATERIAL

Henry C. Unkauf, Endicott, N. Y., assignor to General Aniline & Film Corporation, New York, N. Y., a corporation of Delaware No Drawing. Application October 29, 1947, Serial No. 782,967

17 Claims. (Cl. 95—7)

This invention relates to photography, and more particularly to a method of preparing diazotype photoprinting material, and the compositions employed therein.

Diazotype photoprinting material comprises a base or carrier provided with a light sensitive layer which contains a light sensitive diazo compound and, in most cases, an azo coupling component, the layer being stabilized against coupling of said ingredients prior to development thereof. Exposure of such a layer to light of locally varied intensity, as by illumination under an original bearing a pattern to be reproduced, for example, a line drawing or photographic transparency, partly or completely destroys the diazo compound in the illuminated areas, and upon subsequent development, for example by treatment with alkaline vapor such as ammonia or with an alkaline solution, the residual diazo compound couples with the coupling component to form a colored image of the original design.

It was known heretofore to sensitive films of plastic materials with diazotype sensitizing compositions by application of a solution of said compositions to the pre-formed film. Diazotype compositions were generally applied for this purpose in the form of a solution in an aqueous solvent, since the diazotype sensitizing components generally required presence of a substantial amount of water to bring them into solution in sufficient concentration to effect satisfactory impregnation of the film. While sensitizing solutions containing substantial amounts of water were suitable for impregnation of relatively hydrophilic films, and if prepared with a water-miscible organic swelling agent, could also be used for impregnating certain relatively water-resistant films such as cellulose acetate, such aqueous sensitizing solutions were unsuitable for impregnating films of highly water-repellent resins, particularly vinyl polymer resins such as polymers of vinyl halides, vinylidene halides, and copolymers of vinyl halides with vinyl acetate or maleic acid. Heretofore, diazotype sensitizing compositions were incorporated in other highly water-repellent resins such as polystyrene, by suspending the sensitizing component in a solution of the resin in an organic solvent. The resulting composition could be applied to a support and allowed to dry thereon to form a light sensitive layer, but could not be used conveniently or economically for the production of self-sustaining films of the resin sensitized for diazotype reproduction.

Pre-formed films of water-repellent vinyl polymers are especially advantageous for use as diazotype sensitized materials, in view of the fact that they are readily available in clear or opaque and in colorless or colored form, and in view of the fact that they provide tough durable structures, resistant to water and aqueous solutions and having utmost dimensional stability and resistance to permanent distortion when exposed to the influence of atmospheric moisture, and handling.

It is accordingly an object of this invention to provide a water-repellent vinyl polymer film sensitized with a diazotype composition, and a method and composition for producing the same from pre-formed water-repellent vinyl polymer film.

I have discovered that pre-formed films of water-repellent vinyl polymers (the latter term being used herein to include copolymers) can be sensitized by applying to the film, a solution of diazotype sensitizing components in a non-aqueous solvent mixture of low boiling ketones with certain high boiling solvents, namely, gamma-lactones containing 4 to 6 carbon atoms, the sensitizing components being selected to yield a solution in a solvent mixture of the aforesaid type. Thus, I have found that the resulting solutions penetrate a pre-formed film of water-repellent vinyl polymer as described above, rapidly and uniformly, without injury to the surface of the film, and upon evaporation of the solvents, the sensitizing composition remains uniformly impregnated in the surface portions of the film. After exposure to light under an original to be reproduced, a film thus sensitized can be readily developed by treatment with gaseous ammonia.

Sensitizing compositions which are soluble in the solvent mixture employed in accordance with my invention include, for example, boron trifluoride double salts of light sensitive diazonium compounds of the type heretofore used in diazotype sensitization; resinous condensation products of aldehydes such as formaldehyde with light sensitive diazo compounds, such condensation products being disclosed in U. S. P. 2,063,631; and p-amino-phenyl sulfones of light sensitive diazo bodies. The azo coupling component incorporated in my solutions can be of any type commonly employed in diazotype sensitization. However, coupling components containing sulfonic acid groups or similarly highly hydrophilic groups tending to render the compounds relatively insoluble in non-aqueous organic solvents of the type here employed, are preferably avoided.

The solvent mixture employed as a vehicle for the sensitizing composition of my invention contains one or more lower ketones, i. e., acyclic ketones of not more than 5 carbon atoms, and in conjunction therewith, a gamma-lactone of 4 to 6 carbon atoms, e. g., gamma-butyrolactone, gamma-valerolactone, gamma-caprolactone, α-methyl-gamma-butyrolactone. The amount of said gamma-lactones is preferably not more than one part per part by weight of said lower ketones.

The film to be sensitized can be of any desired thickness and is composed of a water-repellent vinyl polymer such as a vinyl chloride polymer, a vinylidene chloride polymer, or copolymers of vinyl chloride with vinyl acetate or maleic acid.

The sensitizing solution can be conveniently applied to the water-repellent vinyl polymer film by coating the film with the solution in a vertical whirler, wherein, for example, sheets up to a size of 20"x50" can be satisfactorily and uniformly coated. If desired, an "adhesive" may be included in the solution to increase its adhesion characteristics toward the film. Such an "adhesive" may be, for example, a small amount of a resin on the same kind as that of the film to be coated, such resin being employed in the sensitizing solution in concentrations amounting to not more than a fraction (e. g., 0.25) of a percent.

Upon exposure of the resulting sensitized films of my invention under a translucent original bearing an opaque design or pattern to be reproduced, for example, by illumination with a carbon arc lamp, and subsequently developing the image by exposure to alkaline vapor such as ammonia, clear, sharp, permanent, stable, light-fast diazotype images are obtained in a variety of colors depending upon the azo and diazo components employed for the diazotype sensitizing solution.

The following example illustrates the preparation of a preferred sensitizing composition in accordance with my invention, and its use for sensitizing a sheet of water-repellent vinyl polymer resin.

*Example*

A solvent mixture was prepared including the following ingredients:

| | | |
|---|---|---|
| Gamma-valerolactone | cc | 175 |
| Methyl ethyl ketone | cc | 175 |
| Acetone | cc | 100 |

The following stabilizing ingredients were then dissolved in the foregoing mixture.

| | | |
|---|---|---|
| Formic acid | cc | 25 |
| Mellitic acid | g | 2–10 |

25 cc. of a 5% solution of vinyl chloride-vinyl acetate copolymer in gamma-valerolactone can be advantageously added to increase the adhesive properties of the composition toward the film subsequently coated therewith. The adhesive resin, however, can be omitted.

The following sensitizing components were then dissolved in the foregoing solvent mixture.

5–15 g. p-N,N-diethylaminobenzene diazonium chloride-boron fluoride double salt
0.6–15 g. of resorcinol The resulting solution was applied by means of a vertical whirler to a sheet of water-repellent vinyl polymer resin, for example, a vinyl chloride-vinyl acetate copolymer, having a thickness from 0.01 to 0.125", and dimensions up to 20"x50". The resulting sheet was dried in the dark at temperatures not exceeding 125° F.

Said treatment effects impregnation of the surface of the vinyl polymer sheet in a uniform manner by the diazotype sensitizing components without distortion or other injury to the sheet.

The resulting sheet was exposed to light from a carbon arc lamp under an original to be reproduced, and was then developed by treatment with ammonia vapor. A dimensionally accurate, clear, sharp, permanent, stable, light-fast image of the original was obtained.

Similarly advantageous results were obtained upon substituting, for the resorcinol of the foregoing example, similar amounts of other coupling components commonly used in diazotype compositions. Such coupling components include, for example, dichloro-resorcinol, phloroglucinol, and 2,3-dihydroxynaphthalene. Preferably however, the coupling components employed are those having no sulfonic acid groups or other similar polarizing groups substituted therein.

Equally good results were also obtained upon substituting for the diazonium chloride-boron fluoride double salt of the example, a similar amount of a resinous diazonium compound prepared, for example, by condensing p-diazo-N,N-diethyl-aniline with formaldehyde in strong mineral acid medium according to the disclosure of U. S. P. 2,063,631. Moreover, similar amounts of p - diethylaminophenyl - diazo - (p - aminophenyl) -sulfone can be used.

Other suitable diazo sensitizing components are the boron fluoride double salts or resinous acidic aldehyde condensation products derived from various mono - diazotized p - phenylenediamines, wherein one or both hydrogens of the non-diazotized amino group contain substituents. Such diazo derivatives include, for example, those derived from p - amino - N - methyl - aniline, p-amino-N-2'-hydroxyethyl aniline, p-amino-N-ethyl - N - 2' - hydroxyethyl aniline, 4 - amino-2-methoxy-N-cyclohexyl-aniline, p-amino-N,N-diethyl - m - toluidine, and 3 - amino - carbazole. Moreover, the para-aminophenyl sulfones of the diazo compounds of the foregoing amines can be similarly employed.

In preparing the solvent mixture for use in the above example, similar amounts of other gamma-lactones of 4 to 6 carbon atoms, e. g., gamma-butyrolactone, gamma-caprolactone, or α-methyl-gamma-butyrolactone can be substituted for the valerolactone of the example; and instead of acetone and/or methyl ethyl ketone, a corresponding amount of one or more other lower boiling ketones (i. e., ketones which boil no more than a few degrees above 100° C. ), such as methyl propyl ketone, methyl isopropyl ketone, and diethyl ketone can be used. The amount of gamma-lactone can vary from ½ to 1 part by weight per part of the low boiling ketone or ketones in the mixture.

Stabilizers for preventing premature coupling of the diazo compound and azo coupling component which are included in my compositions are generally organic acids soluble in the organic solvent mixture, e. g., formic acid or mellitic acid.

The water-repellent vinyl polymer film employed can be clear or opaque, and colorless or colored. Instead of the vinyl chloride-vinyl acetate copolymer employed in the example, films of polyvinyl chloride, polyvinylidene chloride, or copolymers of vinyl chloride with maleic acid can be used.

In applying the sensitizing solution to the water-repellent film, any of the methods commonly employed in the case of aqueous solutions and hydrophilic films can be used. Thus, the film can be passed through a bath of sensitizing solution, or passed over the solution with one surface in contact with the surface of the bath, to sensitize one or both sides of the film, excess sensitizing solution being allowed to drain off or removed by a doctor blade. The dissolved vinyl polymer present in the sensitizing solution of the example can be omitted when increased viscosity is of no consequence in the particular coating or impregnation method employed.

Other variations and modifications can be made in the foregoing procedure and compositions, as will be obvious to those skilled in the art, without departing from the nature or scope of the invention.

I claim:

1. A diazotype sensitizing solution for water-repellent vinyl polymer resins of the class consisting of polymers of vinyl chloride and vinylidene chloride, and copolymers of vinyl chloride with vinyl acetate and of vinyl chloride with maleic acid, comprising as the solvent medium thereof, a mixture of a gamma-lactone having 4 to 6 carbon atoms with at least one low boiling ketone, said solution containing a light sensitive diazo compound dissolved in said solvent medium.

2. A diazotype sensitizing solution for water-repellent vinyl polymer resins of the class consisting of polymers of vinyl chloride and vinylidene chloride, and copolymers of vinyl chloride with vinyl acetate and of vinyl chloride with maleic acid, comprising as the solvent medium thereof, a mixture of a gamma-lactone having 4 to 6 carbon atoms with at least one low boiling ketone, said lactone amounting to not more than one part per part by weight of the ketone components thereof, said solution containing a light sensitive diazo compound, an azo coupling component, and an acid stabilizer for the resulting composition, dissolved in said solvent medium.

3. A diazotype sensitizing solution as defined in claim 2 including a small amount of an adhesive resin.

4. A diazotype sensitizing solution for water-repellent vinyl polymer resins of the class consisting of polymers of vinyl chloride and vinylidene chloride, and copolymers of vinyl chloride with vinyl acetate and of vinyl chloride with maleic acid, comprising as the solvent medium thereof, a mixture of gamma-valerolactone with at least one low boiling ketone, said lactone amounting to ½ to 1 part per part by weight of the ketone components thereof, said solution containing a boron fluoride double salt of a light sensitive diazo compound, an azo coupling component and an acid stabilizer for the resulting composition, dissolved in said solvent medium.

5. A diazotype sensitizing solution for water-repellent vinyl polymer resins of the class consisting of polymers of vinyl chloride and vinylidene chloride, and copolymers of vinyl chloride with vinyl acetate and of vinyl chloride with maleic acid, comprising as the solvent medium thereof, a mixture of gamma-valerolactone with at least one low boiling ketone, said lactone amounting to ½ to 1 part per part by weight of the ketone components thereof, said solution containing a resinous condensation product of an aldehyde with a light sensitive diazo compound, an azo coupling component and an acid stabilizer for the resulting composition, dissolved in said solvent medium.

6. A diazotype sensitizing solution for water-repellent vinyl polymer resins of the class consisting of polymers of vinyl chloride and vinylidene chloride, and copolymers of vinyl chloride with vinyl acetate and of vinyl chloride with maleic acid, comprising as the solvent medium thereof, a mixture of gamma-valerolactone with at least one low boiling ketone, said lactone amounting to ½ to 1 part per part by weight of the ketone components thereof, said solution containing a p-aminophenyl sulfone of a light sensitive diazo compound, an azo coupling component and an acid stabilizer for the resulting composition, dissolved in said solvent medium.

7. The method of making light sensitive diazotype material which comprises applying to a surface of a pre-formed film of a water-repellent vinyl polymer resin of the class consisting of polymers of vinyl chloride and vinylidene chloride, and copolymers of vinyl chloride with vinyl acetate and of vinyl chloride with maleic acid, a solution comprising as its solvent medium a mixture of a gamma-lactone of 4 to 6 carbon atoms with at least one low boiling ketone, and containing a light sensitive diazo compound dissolved in said solvent medium; and drying said film.

8. The method of making light sensitive diazotype material which comprises applying to a surface of a pre-formed film of a water-repellent vinyl polymer resin of the class consisting of polymers of vinyl chloride and vinylidene chloride, and copolymers of vinyl chloride with vinyl acetate and of vinyl chloride with maleic acid, a solution comprising as its solvent medium a mixture of a gamma-lactone of 4 to 6 carbon atoms with at least one low boiling ketone, said lactone amounting to not more than one part per part by weight of the ketone components thereof, and containing a light sensitive diazo compound, an azo coupling component and an acid stabilizer for the resulting composition dissolved in said solvent medium; and drying said film.

9. A method of making light sensitive diazotype material as defined in claim 8 wherein said solution includes a small amount of an adhesive resin.

10. The method of making light sensitive diazotype material which comprises applying to a surface of a pre-formed film of water-repellent vinyl polymer resin of the class consisting of polymers of vinyl chloride and vinylidene chloride, and copolymers of vinyl chloride with vinyl acetate and of vinyl chloride with maleic acid, a solution comprising as its solvent medium a mixture of gamma-valerolactone with at least one low boiling ketone, said lactone amounting to ½ to 1 part per part by weight of the ketone components thereof, and containing a boron fluoride double salt of a light sensitive diazo compound, an azo coupling component and an acid stabilizer for the resulting composition dissolved in said solvent medium; and drying said film.

11. The method of making light sensitive diazotype material which comprises applying to a surface of a pre-formed film of water-repellent vinyl polymer resin of the class consisting of polymers of vinyl chloride and vinylidene chloride, and copolymers of vinyl chloride with vinyl acetate and of vinyl chloride with maleic acid, a solution comprising as its solvent medium a mixture of gamma-valerolactone with at least one low boiling ketone, said lactone amounting to ½ to 1 part per part by weight of the ketone components thereof, and containing a resinous condensation product of an aldehyde with a light sensitive diazo compound, an azo coupling component and an acid stabilizer for the resulting composition dissolved in said solvent medium; and drying said film.

12. The method of making light sensitive diazotype material which comprises applying to a surface of a pre-formed film of water-repellent vinyl polymer resin of the class consisting of polymers of vinyl chloride and vinylidene chloride, and copolymers of vinyl chloride with vinyl acetate and of vinyl chloride with maleic acid, a solution comprising as its solvent medium a mixture of gamma-valerolactone with at least one low boiling ketone, said lactone amounting to ½ to 1 part per part by weight of the ketone components thereof, and containing a p-aminophenyl sulfone of a light sensitive diazo compound, an azo coupling component and an acid stabilizer for the resulting composition dissolved in said solvent medium; and drying said film.

13. Light sensitive diazotype material, comprising a pre-formed film of a water-repellent vinyl polymer of the class consisting of polymers of vinyl chloride and vinylidene chloride, and copolymers of vinyl chloride with vinyl acetate and of vinyl chloride with maleic acid, having a surface portion only thereof impregnated with a light sensitive diazo compound.

14. Light sensitive diazotype material, comprising a pre-formed film of a water-repellent vinyl polymer of the class consisting of polymers of vinyl chloride and vinylidene chloride, and copolymers of vinyl chloride with vinyl acetate and of vinyl chloride with maleic acid, having a surface portion only thereof impregnated with a light sensitive diazo compound, an azo coupling component and an acid stabilizer therefor.

15. Light sensitive diazotype material, comprising a pre-formed film of a water-repellent vinyl polymer of the class consisting of polymers of vinyl chloride and vinylidene chloride, and copolymers of vinyl chloride with vinyl acetate and of vinyl chloride with maleic acid, having a surface portion only thereof impregnated with a boron fluoride double salt of a light sensitive diazo compound, an azo coupling component and an acid stabilizer therefor.

16. Light sensitive diazotype material, comprising a pre-formed film of a water-repellent vinyl polymer of the class consisting of polymers of vinyl chloride and vinylidene chloride, and copolymers of vinyl chloride with vinyl acetate and of vinyl chloride with maleic acid, having a surface portion only thereof impregnated with a resinous condensation product of an aldehyde with a light sensitive diazo compound, an azo coupling component and an acid stabilizer therefor.

17. Light sensitive diazotype material, comprising a pre-formed film of a water-repellent vinyl polymer of the class consisting of polymers of vinyl chloride and vinylidene chloride, and copolymers of vinyl chloride with vinyl acetate and of vinyl chloride with maleic acid, having a surface portion only thereof impregnated with a p-aminophenyl sulfone of a light sensitive diazo compound, an azo coupling component and an acid stabilizer therefor.

HENRY C. UNKAUF.

REFERENCES CITED

The following references are of record in the file of this patent:

UNITED STATES PATENTS

| Number | Name | Date |
|---|---|---|
| 1,370,922 | Seel et al. | Mar. 8, 1921 |
| 1,947,160 | Holzwarth | Feb. 13, 1934 |
| 1,997,745 | Renker | Apr. 16, 1935 |
| 2,063,832 | Werner | Dec. 8, 1936 |
| 2,151,532 | Schmidt et al. | Mar. 2, 1939 |
| 2,157,384 | Davidson | May 9, 1939 |
| 2,197,456 | Von Poser et al. | Apr. 16, 1940 |
| 2,388,817 | Beguin et al. | Nov. 13, 1945 |
| 2,405,523 | Sease et al. | Aug. 6, 1946 |
| 2,409,564 | Heinecke et al. | Oct. 15, 1946 |
| 2,423,749 | Austin | July 8, 1947 |

FOREIGN PATENTS

| Number | Country | Date |
|---|---|---|
| 536,714 | Great Britain | May 23, 1941 |